(12) United States Patent
Sabino et al.

(10) Patent No.: US 7,511,611 B2
(45) Date of Patent: Mar. 31, 2009

(54) SYSTEMS FOR AND METHODS OF ASSET MANAGEMENT IN A WASTE MANAGEMENT SERVICE ENVIRONMENT

(75) Inventors: Alan Sabino, Rutland, VT (US); Jessica Hewitt, Queensbury, NY (US); William Petrow, Charlotte, VT (US)

(73) Assignee: Casella Waste Systems, Inc., Rutland, VT (US)

( * ) Notice: Subject to any disclaimer, the term of this patent is extended or adjusted under 35 U.S.C. 154(b) by 184 days.

(21) Appl. No.: 11/435,688

(22) Filed: May 18, 2006

(65) Prior Publication Data

US 2007/0268759 A1     Nov. 22, 2007

(51) Int. Cl.
*G08B 23/00* (2006.01)
(52) U.S. Cl. ............... 340/500; 340/539.1; 340/539.13; 340/572.1; 340/825.36; 340/825.49
(58) Field of Classification Search ................. 340/500, 340/539.1, 539.13, 572.1, 825.36, 825.49
See application file for complete search history.

(56) References Cited

U.S. PATENT DOCUMENTS

| | | | | |
|---|---|---|---|---|
| 5,014,206 A | * | 5/1991 | Scribner et al. ............. | 701/207 |
| 5,121,853 A | | 6/1992 | Edelhoff et al. | |
| 5,326,939 A | | 7/1994 | Schafer et al. | |
| 5,392,926 A | | 2/1995 | Schafer et al. | |
| 5,416,706 A | * | 5/1995 | Hagenbuch ................... | 701/50 |
| 5,565,846 A | * | 10/1996 | Geiszler et al. .......... | 340/572.2 |
| 6,191,691 B1 | | 2/2001 | Serrault et al. | |
| 6,448,898 B1 | | 9/2002 | Kasik | |
| 2003/0112155 A1 | | 6/2003 | Landre et al. | |
| 2004/0027243 A1 | | 2/2004 | Carrender | |

FOREIGN PATENT DOCUMENTS

| | | |
|---|---|---|
| EP | 0905057 A1 | 3/1999 |
| EP | 0760985 B1 | 3/2000 |
| EP | 1477430 A1 | 11/2004 |

* cited by examiner

*Primary Examiner*—Daryl C Pope
(74) *Attorney, Agent, or Firm*—Wilmer Cutler Pickering Hale and Dorr LLP

(57) ABSTRACT

One embodiment of the present invention includes an identification mechanism, such as a radio frequency identification (RFID) tag or barcode, associated with a waste container. The identification mechanism contains an identifier that can be used to identify the waste container, and that can be read by a vehicle with an identification reader. In addition, the location of the waste container can be determined using a GPS receiver. The waste container identifier and its corresponding location can then be stored in a computer for later transmission to a second computer, for example, by using a wireless communication link. The second can be used to associate the waste container identifier and the waste container's position with a customer.

15 Claims, 4 Drawing Sheets

| Asset ID 210 | Service GPS Coordinates 230 | Deployment GPS Coordinates 240 | Date and Time of Container Installation 280 | Date and Time of Service 290 | Decommission 298 |
|---|---|---|---|---|---|
| 1010 | 34.060161, -118.280740 | 34.060161, -118.280740 | 01/15/2006 12:23:12pm | 04/25/2006 2:30:02pm | No |
| 1020 | 34.104343, -118.259132 | 34.104343, -118.259132 | 01/18/2006 6:15:05am | 04/25/2006 6:09:02pm | Yes |
| 1030 | 33.947418, -118.116589 | 33.947418, -118.116589 | 03/21/2006 9:50:50am | 04/27/2006 1:37:02pm | Yes |
| 1040 | 34.087071, -118.073673 | 34.087071, -118.073673 | 03/05/2006 8:37:03pm | 04/27/2006 10:12:44am | No |

FIG. 2A

| Asset ID 210 | Purchase Date 220 | Service GPS Coordinates 230 | Deployment GPS Coordinates 240 | Customer Name and Address 250 | Asset Type 260 | Asset Value 270 | Date and Time of Installation 280 | Date and Time of Service 290 | Contract Data 295 | Decommission 298 |
|---|---|---|---|---|---|---|---|---|---|---|
| 1010 | 12/12/2006 | 34.060161, -118.280740 | 34.060161, -118.280740 | Retailer A 123 Main St., Los Angeles, CA | dumpster | $500 | 01/15/2006 12:23:12pm | 04/25/2006 2:30:02pm | $250/mo Expires 12/31/2006 | No |
| 1020 | 12/12/2006 | 34.104343, -118.259132 | 34.104343, -118.259132 | Restaurant B 394 Food Lane Los Angeles, CA | roll-off container | $1000 | 01/18/2006 6:15:05am | 04/25/2006 6:09:02pm | $850/mo Expires 12/31/2008 | Yes |
| 1030 | 01/19/2006 | 33.947418, -118.116589 | 33.947418, -118.116589 | Manufacturer C 12 Industrial Park, Santa Monica, CA | rolling lift cart | $1500 | 03/21/2006 9:50:50am | 04/27/2006 1:37:02pm | $950/mo Expires 06/15/2006 | Yes |
| 1040 | 02/20/2006 | 34.087071, -118.073673 | 34.087071, -118.073673 | Retailer B 932 Meadow Ave., Pasadena, CA | dumpster | $600 | 03/05/2006 8:37:03pm | 04/27/2006 10:12:44am | $150/mo Expires 04/05/2007 | No |

FIG. 2B

SYSTEMS FOR AND METHODS OF ASSET MANAGEMENT IN A WASTE MANAGEMENT SERVICE ENVIRONMENT

BACKGROUND OF THE INVENTION

1. Field of the Invention

Embodiments of the present invention relate to the field of mobile asset tracking and monitoring and, more particularly, to systems for and methods of tracking and monitoring assets in a waste management service environment.

2. Background of the Invention

Commonly, in conjunction with the collection of refuse, a waste management collection service provides waste containers at a plurality of customer sites. The collection service then takes appropriate steps, generally according to a pre-established schedule, to empty the containers and remove the contents for disposal. Waste container types used by customers are diverse in the industry and include, for example, residential or commercial large-volume metal containers such as dumpsters, roll-off containers, and rolling lift (or tip) carts.

Waste containers are significant assets. A waste management collection service may deploy thousands of containers in the field, each of which typically cost several thousand dollars. This can result in an asset inventory that totals in the millions or tens-of-millions of dollars. Consequently, there is a large capital investment made by waste management collection service providers in these mobile assets.

Customer turnover and other events require that new containers be deployed and old containers be removed from service as a part of normal business operations. Unfortunately, in some cases, containers are moved without the knowledge of the waste management collection service. Presently, however, other than at initial purchase and deployment, there is no automated way to determine the location of container assets in a waste management environment.

We have determined that there exists a need to provide an automated manner in which an inventory of container assets can be created and maintained. We have also determined that there exists a need to provide a way to identify container assets deployed at customer sites, identify missing containers, and minimize any potential interruption of customer service.

LIST OF FIGURES

The Detailed Description including the description of preferred systems and methods embodying features of the invention will be best understood when read in reference to the accompanying figures wherein:

FIGS. 2A and 2B illustrate exemplary instantiations of a database that can be utilized in accordance with one or more embodiments of the present invention.

SUMMARY OF EMBODIMENTS OF THE INVENTION

Figure 1:
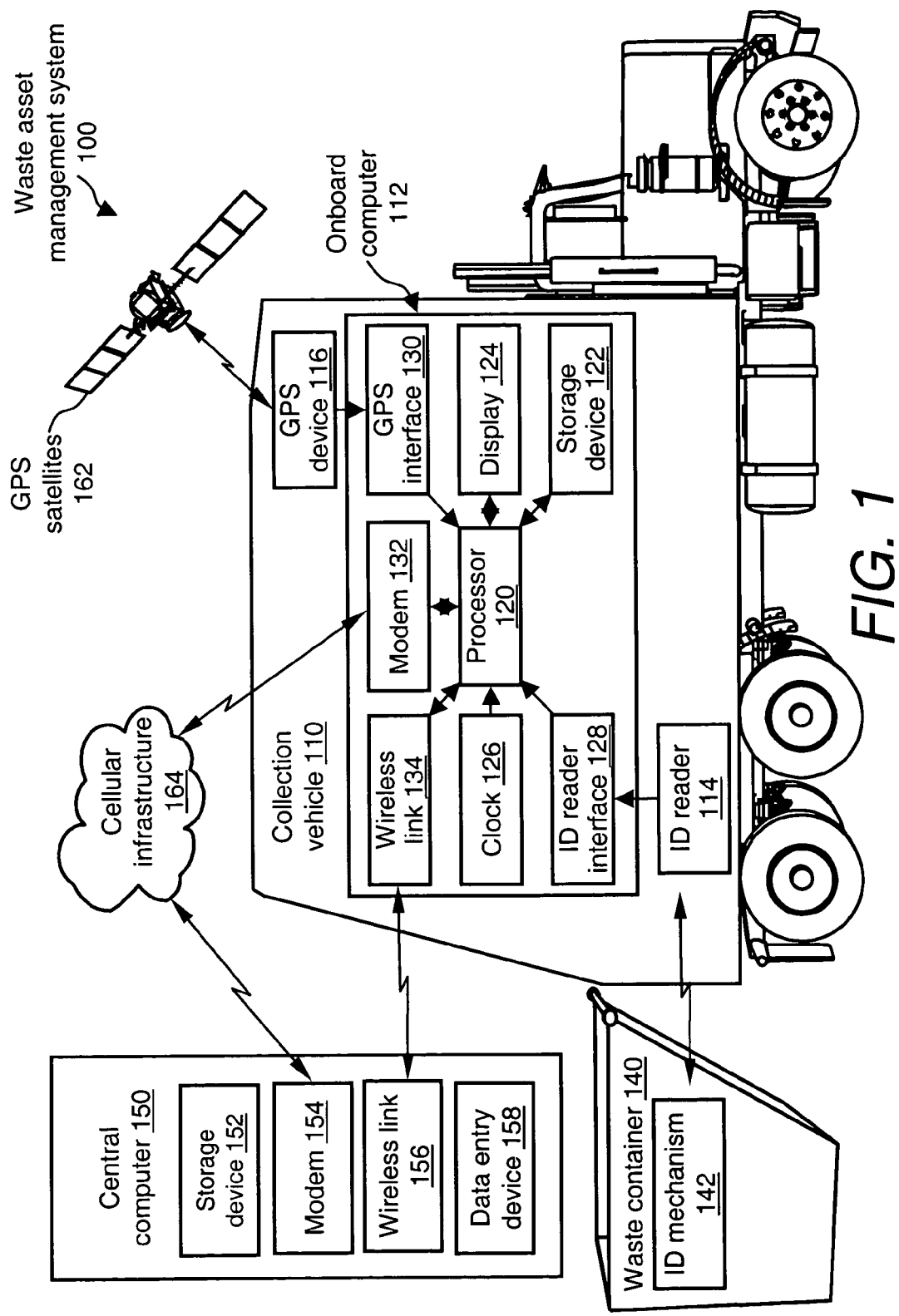
FIG. 1 is a functional block diagram of a waste asset management system in accordance with one or more embodiments of the present invention.

Embodiments of the present invention are directed to systems for and methods of tracking and monitoring assets in a waste management service environment. Systems and methods are provided that enable a waste management service provider to create, maintain, and update an inventory of waste container assets. Additionally, systems and methods in accordance with embodiments of the present invention provide a way to identify container assets deployed at particular customer sites, identify missing containers, and reduce potential interruption of customer service.

In one embodiment of the present invention, a system for monitoring assets in a waste collection environment includes an identification mechanism, associated with a waste container, that includes a waste container identifier. A vehicle includes a reader for reading the identification mechanism and determining the waste container identifier. A computer associated with the vehicle receives and stores the waste container identifier transmitted by the reader, and further receives and stores position data associated with the waste container. A second computer receives from the computer, via wireless transmission, and stores the waste container identifier and the position data, and associates the waste container identifier with a customer.

The identification mechanism includes at least one of a radio frequency identification (RFID) tag and a barcode. The second computer may also receive, store, and associate with the waste container identifier at least one of a waste container purchase date, a street address at which the waste container is deployed, a name of the customer, an asset manufacturer, an asset model number, and an asset value. In addition, the computer records a time at which the waste container is emptied, and transmits to the second computer the time at which the waste container is emptied.

The second computer further receives, stores and associates with the waste container identifier at least one of a waste container purchase date, a street address at which the waste container is deployed, a customer name, an asset manufacturer, an asset model number, and an asset value. The computer is configured to receive global positioning system (GPS) data, which is stored as position data.

The second computer further receives, stores and associates with the waste container identifier at least one of a waste container purchase date, a street address at which the waste container is deployed, a customer name, an asset manufacturer, an asset model number, and an asset value. A wireless communication link enables the computer and the second computer to communicate, and the waste container identifier position data are transmitted using the wireless communication link.

In another embodiment of the present invention, a computer-implemented and user assisted method for monitoring assets in a waste collection environment includes providing an identification mechanism, associated with a waste container, that includes a waste container identifier. A vehicle is provided that includes a reader for reading the identification mechanism and determining the waste container identifier, and a first computer that receives and stores the waste container identifier from the reader, and position data associated with the waste container. A second computer receives, via wireless transmission, and stores the waste container identifier and the position data transmitted to the second computer by the first computer.

DETAILED DESCRIPTION OF EMBODIMENTS

FIG. 1 is a functional block diagram of a waste asset management system 100 in accordance with an embodiment of the present invention. System 100 includes collection vehicle 110 that, in turn, includes or utilizes onboard computer 112, identification (ID) reader 114, and Global Positioning System (GPS) device 116. Collection vehicle 110 is a standard waste hauling truck that is used to collect and pick up waste material from residential curbsides, community drop-off points, industrial sites, and the like.

Onboard computer 112 is a standard computing apparatus such as a laptop personal computer (PC). Alternatively, onboard computer 112 can be a PC that is physically integral with collection vehicle 110. Computer 112 can be supplied by Glacier Computing (New Milford, Conn.) or by Mobile Computing Corp. Inc. (Mississauga, Ontario). Onboard computer 112 further includes standard components such as processor 120, storage device 122, display 124, clock 126, ID reader interface 128, GPS interface 130, modem 132, wireless link 134, and software such as the Microsoft Windows® operating system.

Processor 120 is a central processing unit (CPU) such as a Pentium™ microprocessor. Storage device 122 is a non-volatile memory, such as a hard disk drive or CD-ROM drive. Display 124 can be, for example, a standard personal computer (PC) monitor. Clock 126 is standard circuitry that can provide the calendar date and the time of day. ID reader interface 128 is an interface, such as a universal serial bus (USB) port, that allows data (e.g., RFID data) from ID mechanism 142 to be transmitted to processor 120. In general, data stored from ID mechanism 142 will be stored as and correspond to asset ID 210, shown in FIGS. 2A and 2B.

GPS interface 130 can be a standard USB port that allows GPS information, such as digital latitude and longitude, to be transmitted to processor 120. Modem 132 is a wireless modem, such as provided by CYNET Incorporated (Houston, Tex.), that enables wireless communication through cellular infrastructure 164. GPS satellites 162 provide GPS service to terrestrial GPS devices, such as GPS device 116.

Cellular infrastructure 164 can include a plurality of cell towers (not shown) and other standard network infrastructure. Wireless link 134 provides wireless communication via access points (not shown) and a local area network (LAN) that may utilize or include, for example, an IEEE 802.11 network.

ID reader 114 is a commercially available RFID tag reader system, such as the TI RFID system, manufactured by Texas Instruments Incorporated (Dallas, Tex.). GPS device 116 provides position data, such as latitude and longitude, that is used to indicate the location of collection vehicle 110. GPS data may be provided by the GEOTAB GPS system, a commercially available vehicle fleet and productivity management system manufactured by GEOTAB (Burlington, Ontario, Canada).

Waste container 140 is a standard container such as a dumpster or a roll-off container. ID mechanism 142, which can be a standard radio frequency identification (RFID) tag or barcode, is scanned by ID reader 114, which can be a standard RFID or barcode reader, in order to extract, for example, the identification number thereon. ID mechanism 142 is affixed to or associated with waste container 140 by a conventional method (e.g., an adhesive). The identification number is stored in the asset ID 210 field shown in FIGS. 2A and 2B.

Computer 150 is a standard computer, such as a PC, that includes or utilizes standard components and software such as the Microsoft Windows® operating system. Computer 150 includes or may utilize asset repository 152, modem 154, wireless link 156, and data entry device 158.

FIG. 2A, generally at 200, is an exemplary embodiment of a data repository that can be stored on storage device 122. Repository 200 can be implemented using commercially available software, such as Microsoft Access®. As shown, repository 200 can include fields for asset ID 210, service GPS coordinates 230, deployment GPS coordinates 240, date and time of container installation 280, date and time of service 190, and decommission 298.

Deployment GPS coordinates 240 represent the GPS coordinates when a waste container 140 is initially deployed at a customer site. Although GPS coordinates are shown in decimal form, they can also be represented in degrees/minutes/seconds notation. Deployment GPS coordinates 240 are representative of the customer's address stored in customer name and address 250 field, shown in FIG. 2B. Date and time of container installation 280 represents the date and time that waste container 140 was initially deployed at a customer site. Date and time of service 290 is recorded, for example, each time that collection vehicle 110 makes a stop at the customer and services the waste container 140. Decommission 298 represents an indication that can be transmitted from collection vehicle 110 to repository 200 indicating that waste container 140 should be removed from service at a particular customer's site. In addition, computer 150 may provide an indication in decommission 298, indicating, for example, that the waste container 140 at a particular customer 250 should be decommissioned because, for example, the customer's contract 295 (FIG. 2B) is about to expire (and has not been renewed). Service GPS coordinates 230 are entered each time a customer 250 is serviced 290 and provides an indication of the present location of container 140 relative to Deployment GPS coordinates 240. Fields within repository 200 and 202 can generally be updated in any manner at any time to reflect the dynamic realities of the marketplace.

FIG. 2B, generally at 202, is an exemplary embodiment of a data repository that can be stored in storage device 152. Repository 202 can be implemented using commercially available software, such as Microsoft Access®. Repository 202 can store container asset information such as asset ID 210, purchase date 220, service GPS coordinates 230, deployment GPS coordinates 240, customer name and address 250, asset type 260, asset value 270, date and time of installation 280, date and time of service 290, contract data 295, and decommission 298.

The data repository of FIG. 2B can be linked with the data repository of FIG. 2A using, for example, a common field associated with repository 200 and repository 202, such as Asset ID 210 and/or Deployment GPS coordinates 240. Purchase date 220 represents the date the container was purchased. Customer name and address 250 represents the name of a customer and their street address. This information may be used to contact a customer when necessary, such as for billing purposes. Asset type 260 represents the type of container, and can be used to properly determine the Asset value 270 for that container. Asset value 270 represents the current, or estimated, asset value. This value may be determined using straight line depreciation, or other data, such as the recent sale prices of containers of the same type and condition. Date and time of installation 280 represents when the container was installed at a customer site. Contract data 295 represents information regarding the terms of a service contract with a customer. For example, these terms may be the expiration date of the contract, the monthly rate, and/or the service schedule for container servicing.

Returning now to FIG. 1, modem 154 is a wireless modem, such as is provided by CYNET Incorporated (Houston, Tex.). Wireless link 156 provides data communication using a wireless standard or technology such as IEEE 802.11. Data entry device 158 can be a keyboard, mouse, or touch screen.

Figure 3:
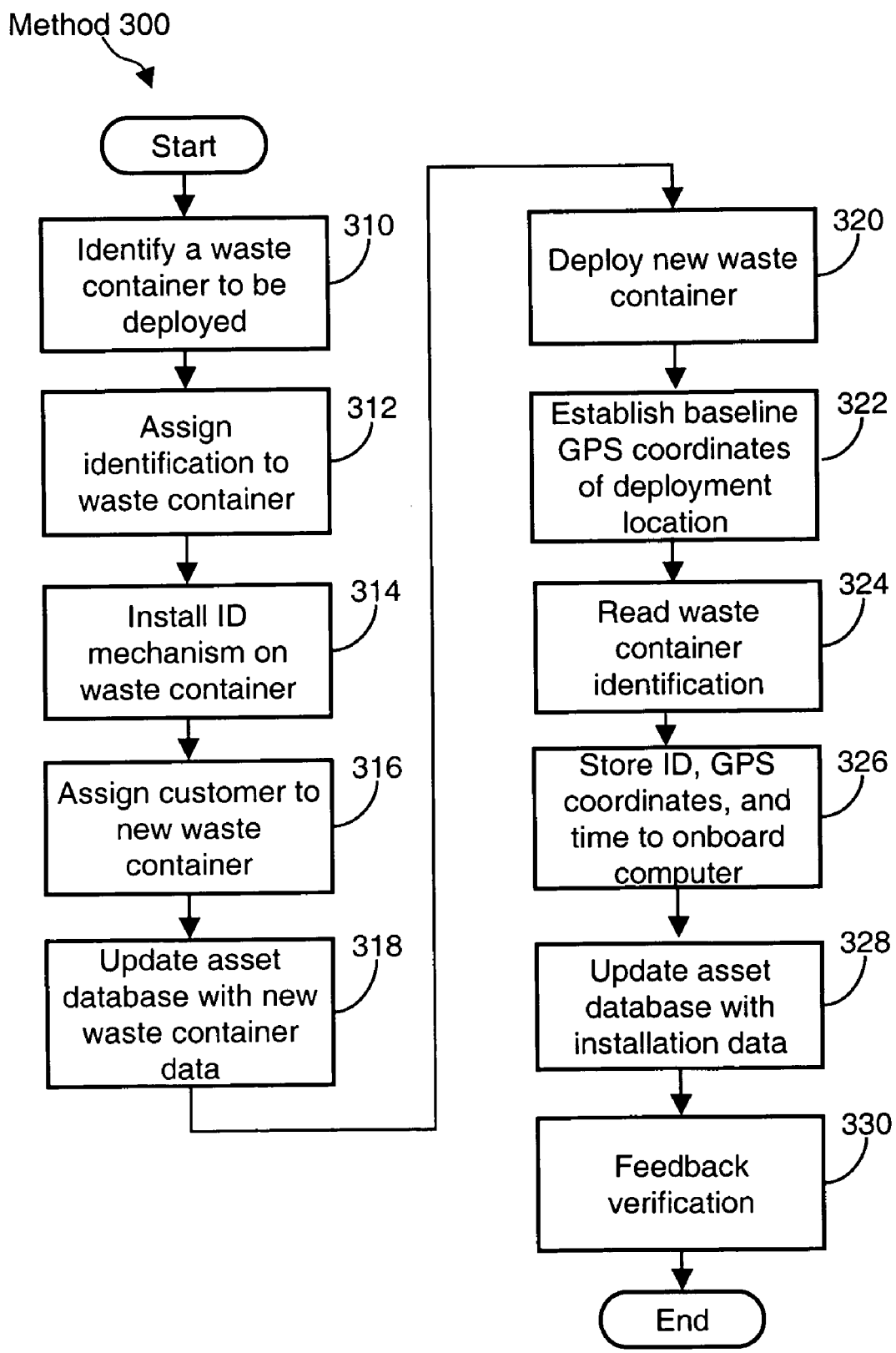
FIG. 3 illustrates an exemplary method of deployment of a waste container.

FIG. 3 illustrates an exemplary method 300 of initial deployment of a waste container 140.

At step 310, a waste container 140 that is to be deployed is identified and selected for deployment. At step 312, ID mechanism 142 is programmed, written to, or otherwise provided with an ID number 210 that associates it uniquely with a particular waste container 140. At step 314, ID mechanism 142 is affixed to the waste container 140.

At step 316, a customer is assigned to, or associated with, a particular waste container 140. In this step, repository 202 may be updated to associate a particular asset ID 210 field with a particular customer name and address 250 field. At step 318, repository 202 can be populated with additional data, such as asset purchase date 220, asset type 260, asset value 270, and/or contract data 295.

An example of these data fields is shown in row 204 of FIG. 2B. In row 204, waste container 140 with asset ID 1010 has been assigned a purchase date of Dec. 12, 2006. At the time of purchase both the asset type 260 and the asset value 270 can be set based on the purchase data associated with the container 140. This initial value assigned to the asset value 270 can be updated during the life of the container 140. Contract data 295 is shown filled in with two relevant terms, the first relating to the rate charged to the customer ($250 a month), and the second to expiration date of service contact (Dec. 31, 2006).

At step 320, waste container 140 is deployed to the customer site 250 and, at step 322, upon or after the arrival of waste container 140 at the customer site, the deployment GPS coordinates 240 are received by onboard computer 112 and stored in repository 200 (on storage device 122). At step 324, prior to or while waste container 140 is unloaded from collection vehicle 110 (or another suitable vehicle) at the customer site, ID mechanism 142 is read by ID reader 114, and asset ID 210 is stored in repository 200 in a manner such that asset ID 210 read by ID reader 114 and deployment GPS coordinates 240 are associated with each other in repository 200. At step 326, date and time of installation 280 is determined from clock 126, and stored in repository 200.

At step 328, asset ID 210, deployment GPS coordinates 240 and the date and time of installation 280, each of repository 200, are transmitted to repository 202 via wireless link 134 and wireless link 156 or, alternatively, via modem 132, cellular infrastructure 164, and cellular modem 156. Alternatively, onboard computer 112 may transmit data 240 and 280 to asset repository 202 after a plurality of waste containers 140 have been deployed. The data associated with each waste container may be stored in repository 200 for a period of time, and transmitted to repository 202, for example, after an entire shift or pick-up route of collection vehicle 110. Row 204 shows a container with asset ID 1010 that has been updated with this type of information. Specifically, deployment GPS coordinates 240 are 34.060161, −18.280740, and the date and time of installation is Jan. 15, 2006 at 12:23:12 pm.

Since repository 202 also has an asset ID 210 field, the data associated with the asset ID 210 field of repository 200 can be transferred to the asset ID 210 field of repository 202, for a particular container 140 having a particular asset ID associated with its ID mechanism 142.

At step 330, computer 150 transmits a verification message to onboard computer 112, indicating that repository 202 has been updated. The verification is transferred via wireless link 158 and wireless link 134 or, alternatively, via cellular modem 156, cellular infrastructure 164, and cellular modem 132.

Servicing of a waste container 140 occurs in a manner similar to that described in FIG. 3. During servicing, repository 200 is updated with service GPS coordinates 230, using on-board computer 112 and GPS device 116. The date and time of service 290 is updated using clock 126. These values can be used to update repository 202 in the same manner as during deployment. Further, service GPS coordinates 230 can be used by computer 150 to confirm that waste container 140 has not moved since deployment. Row 204 shows that the deployment GPS coordinates 240 corresponds to the last service GPS coordinates 230. Updating of repository 202 may also include deriving factors such as asset value 270 at the date and time of service 290 using, for example, a straight line depreciation model. Alternatively, actual or estimated sales data of containers with the same or similar asset type 260 can be used to determine the current asset value 270.

If during service, decommission field 298 indicates that a container is to be decommissioned, collection vehicle 110 can take the appropriate steps at a customer's site. Decommissioning may occur, for example, at the end of a contract, or when waste container needs to be replaced. Decommissioning may require removing or replacing the waste container, notifying the customer, and updating repositories 200 and 202.

Having thus described our invention, what we claim as new and desire to secure by Letters Patent is as follows:

1. A system for tracking and monitoring a plurality of waste containers in a waste collection environment, comprising:
    an identification mechanism, associated with each waste container of the plurality of waste containers, the identification mechanism comprising a waste container identifier;
    a vehicle comprising:
        a reader for reading the identification mechanism associated with the waste container and determining the waste container identifier,
        a global positioning device for determining position data associated with the waste container, the global positioning device determining the position data when the waste container is at least one of deployed and serviced, and
        a first computer receiving, via wireless transmission, and storing the waste container identifier transmitted by the reader, and further receiving and storing the position data associated with the waste container; and
    a second computer receiving from the first computer, via wireless transmission, and storing the waste container identifier and the position data, and associating the waste container identifier and the position data with a customer.

2. The system of claim 1, wherein the identification mechanism comprises at least one of a radio frequency identification (RFID) tag and a barcode.

3. The system according to claim 2, wherein the second computer further receives, stores and associates with the waste container identifier at least one of a waste container purchase date, a street address at which the waste container is deployed, a name of the customer, an asset manufacturer, an asset model number, and an asset value.

4. The system according to claim 3, wherein the computer records a time at which the waste container is emptied.

5. The system according to claim 4, wherein the computer transmits to the second computer the time at which the waste container is emptied.

6. The system according to claim 1, wherein the second computer further receives, stores and associates with the waste container identifier at least one of a waste container purchase date, a street address at which the waste container is deployed, a customer name, an asset manufacturer, an asset model number, and an asset value.

7. The system according to claim 1, wherein the computer is configured to receive global positioning system (GPS) data, and the GPS data is stored as the position data.

8. The system according to claim 7, wherein the second computer further receives, stores and associates with the waste container identifier at least one of a waste container purchase date, a street address at which the waste container is deployed, a customer name, an asset manufacturer, an asset model number, and an asset value.

9. A computer-implemented and user assisted method for tracking and monitoring a plurality of waste containers in a waste collection environment, comprising:
providing an identification mechanism, associated with each waste container of the plurality of waste containers, comprising a waste container identifier;
providing a vehicle comprising:
a reader for reading the identification mechanism associated with the waste container and determining the waste container identifier,
a global positioning device for determining position data associated with the waste container, the global positioning device determining the position data when the waste container is at least one of deployed and serviced, and
a first computer receiving and storing the waste container identifier from the reader, and further receiving and storing the position data associated with the waste container; and
receiving via wireless transmission and storing at a second computer, the waste container identifier and the position data transmitted to the second computer by the first computer.

10. The method of claim 9, wherein the identification mechanism comprises at least one of a radio frequency identification (RFID) tag and a barcode.

11. The method of claim 9, further comprising receiving, storing and associating at the second computer, the waste container identifier with at least one of a waste container purchase date, a street address at which the waste container is deployed, a name of the customer, an asset manufacturer, an asset model number, and an asset value.

12. The method of claim 9, further comprising:
recording at the first computer a time at which the waste container is serviced; and
transmitting to the second computer the time at which the waste container is serviced.

13. A computer-implemented and user assisted method for deployment of a plurality of waste containers in a waste collection environment, comprising:
providing an identification mechanism, associated with each waste container of the plurality of waste containers, comprising a waste container identifier;
deploying at least one waste container of the plurality of waste containers at a predetermined location in the waste collection environment;
reading the identification mechanism associated with the deployed waste container and determining the deployed waste container identifier;
determining global positioning data of the location at which the waste container is deployed;
receiving and storing at a first computer the waste container identifier and the position data associated with the deployed waste container;
transmitting form the first computer to a second computer the waste container identifier and the position data associated with the deployed waste container; and
storing and associating at the second computer, the waste container identifier with at least one of a waste container purchase date, the global positioning data at which the waste container is deployed, a name of the customer, an asset manufacturer, an asset model number, and an asset value.

14. The method of claim 13, further comprising:
recording at the first computer a time at which the waste container is serviced; and
transmitting to the second computer the time at which the waste container is deployed.

15. The method of claim 13, wherein the first computer is an onboard computer on a vehicle.

* * * * *